Fig. 2.

INVENTORS
CHARLES A. LAVERY
FLETCHER O. HOLT
BY
Arthur L Wade
ATTORNEY

United States Patent Office

3,243,938
Patented Apr. 5, 1966

3,243,938
PROCESS AND APPARATUS FOR RECOVERING
HYDROCARBONS FROM GAS STREAMS
Charles A. Lavery and Fletcher O. Holt, Tulsa, Okla.,
assignors to National Tank Company, Tulsa, Okla.,
a corporation of Nevada
Continuation of application Ser. No. 102,819, Apr. 13,
1961. This application Aug. 28, 1964, Ser. No. 395,980
8 Claims. (Cl. 55—20)

This application is a continuation of application Serial No. 102,810, filed April 13, 1961, now abandoned.

This invention relates to the dehydration of gas and the recovery of condensable hydrocarbons from the gas. More specifically, the invention relates to the operation of an adsorption system employing three beds of adsorbent cycled in their connections to a gas stream being processed as the stream is passed through the beds in series.

In disclosing this invention, the flow of gas to be processed will be designated the flow, or a main stream. The flow stream of natural gas from a well head is always saturated, or partially saturated, with moisture in accordance with its origin, pressure and temperature. Should the gas be transmitted with this moisture in it, condensation will result, leading to severe corrosion of the meal pipeline through which it is transmitted. Further, there is the danger of this moisture at lower temperatures forming hydrates which will clog the pipeline and valves.

To eliminate the moisture problem, it is common practice to conduct the wet gas through large beds of adsorbent material. It is possible to have a continuous gas transmission through adsorbent by alternately directing the flow through a plurality of beds. As each bed is saturated with moisture, it is reactivated with a heated gas. This gas could be the air itself, but is usually the process gas itself.

Relatively more attention is now being given to the fact that main streams are saturated, or partially saturated, with pentanes and heavier hydrocarbons in quantities of suffiicent volume to be economically extracted. These constituents can be removed from the main stream by the adsorbent beds as a separate source of revenue. Removal of both the condensable hydrocarbons and water from natural gas, prior to, or during, transmission must be carried out efficiently and economically, to justify the expense of recovering this product.

To regenerate beds of adsorbent which have processed main streams for liquefiable constituents, one common practice is to heat a portion of the main stream gas and recycle this gas in a separate circuit connected to the bed to be regenerated. It is also well known to establish a side stream of the main stream as a regenerating agent, returning this heated split-off side stream to the main stream after it has regenerated a bed of adsorbent.

The present system disclosed is to be distinguished from both the recycled regeneration stream and the split-off, or open-cycle, regeneration stream. The present system normally heats the entire main stream for regenerating an adsorbent bed which has previously adsorbed recoverable constituents from the main stream. The stream, as a regenerating agent, is then cooled and liquefiable components condensed therefrom and recovered. The gas remaining, reverts to its status as a main stream and is then processed by a second bed of adsorbent. The stripped gas from the second bed of adsorbent is then passed through a third bed which has been heated by the main stream to reduce the temperature of the third bed to service temperature.

In all adsorbent systems, operated in a batch manner, there is a problem of reducing the dead load of sorbate left in the regenerated beds when cooled by gas with recoverable constituents in it. Additionally, there is the problem of efficiently exposing the desiccant available to adsorb constituents from the gas stream as the volume of the throughput of gas varies. Another problem is to provide means for switching the physical relation of the beds to the streams under the control of a variable directly related to the efficiency of regeneration. Finally, there is the problem of controlling the regeneration gas heated to regenerate the beds to insure that the beds will be thoroughly regenerated.

A principal object of the present invention is to process a gas stream at one location in the flow of the stream with a first portion of dry adsorbent while reactivating other portions of adsorbent at different locations in the flow stream passed serially through the portions.

Another object is to reduce the shifting load of sorbate in the portions of adsorbent as the portions are cycled in their physical connections to the gas stream.

Another object is to shift the portions of adsorbent in their physical connections to the gas stream on a time schedule which will maintain a substantially constant ratio between the adsorbent weight exposure to the volume of constituents adsorbed.

Another object is to shift the physical connections between the gas stream and the adsorbent portions in accordance with temperature conditions of the adsorbent portions which index completion of regeneration.

Another object is to maintain the regenerating gas volume load on the regenerating heater of a dry adsorbent system below a predetermined maximum as the regenerating gas volume of the system varies.

The present invention contemplates a system employing three portions of dry adsorbent which are contacted in series by a gas stream to regenerate a first portion with heat and adsorb constituents from the gas stream of the second portion and reduce the temperature of a heated regenerated third portion preparatory to its adsorption service.

The invention contemplates the three beds, or the portions, of the adsorbent being shifted in their sequential connections to the gas stream so the bed which has been regenerated with heat will be cooled by that portion of the gas stream which is the leanest portion in the system with respect to recoverable components.

Further, the invention contemplates three beds being shifted in their sequential connections to the gas stream by manifolds valved in accordance with a predetermined temperature being reached by the bed being regenerated.

Further, the invention contemplates a portion of the main gas stream being diverted around the heated bed being regenerated when a predetermined maximum of flow rate of the main gas stream is reached in order to insure the main gas heated to regenerate the bed will bring the heated bed up to the temperature when it is completely regenerated.

Other objects, advantages and features of this invention will become apparent to one skilled in the art upon consideration of the written specification, appended claims, and attached drawings, wherein;

FIG. 3 is a diagrammatic representation of the control system of FIG. 2 in its alternate position;

GENERAL CONDITIONS

The adsorption system disclosed was developed to meet the processing needs of natural gas streams which are commonly referred to as small of volume and rich in recoverable, or liquefiable, hydrocarbons. Small and rich are, of course, relative terms. Under present conditions, the volumes classified as small, range up to about 10MM cubic feet per day. The streams classified as rich, generally have between 200 to 400 gallons of recoverable liquid per million cubic feet of the gas stream. Natural gas streams of this type are readily stripped of their pentanes and heavier hydrocarbons by this system.

*Basic process flow pattern (FIGS. 1, 4 and 6)*

Figure 1:
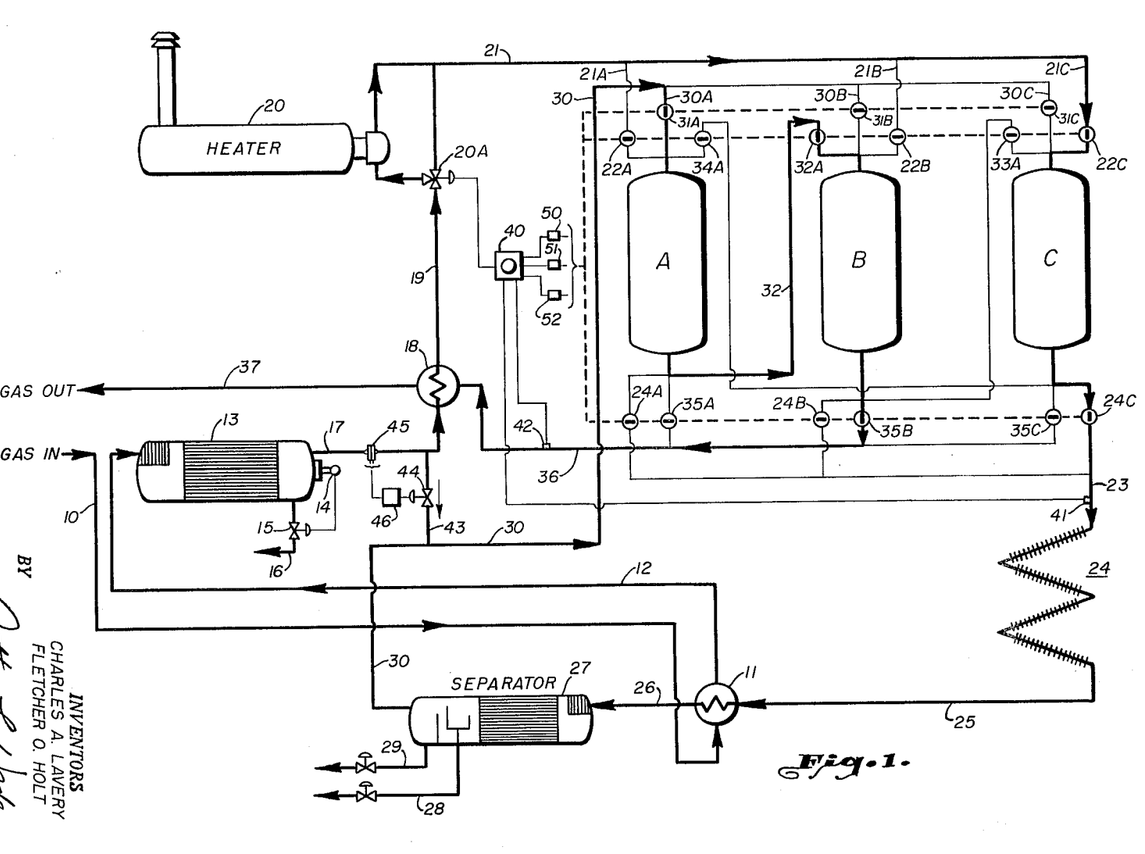
FIG. 1 is a diagrammatic flow sheet of a complete hydrocarbon recovery system embodying the present invention.
Figure 4:
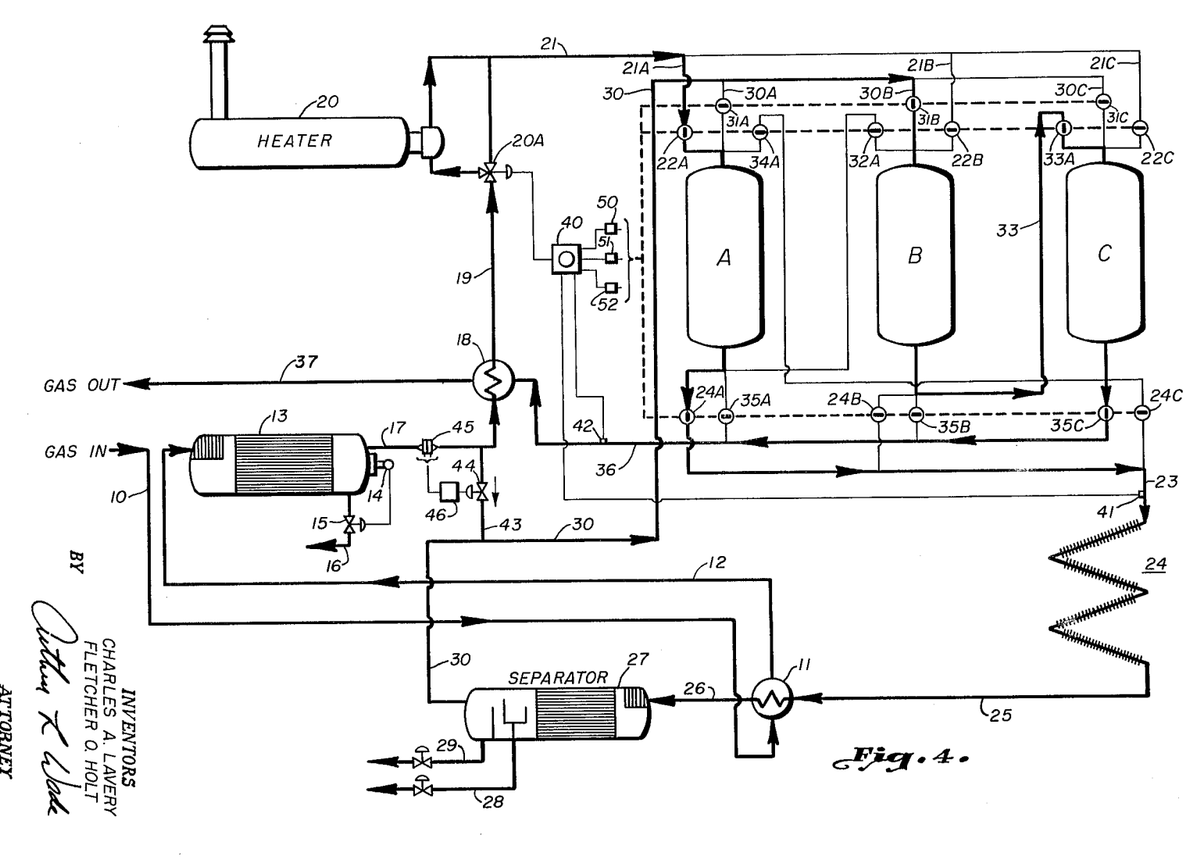
FIG. 4 is a diagrammatic flow sheet of the complete hydrocarbon recovery system of FIG. 1 with the beds shifted to the second of their three positions.
Figure 6:
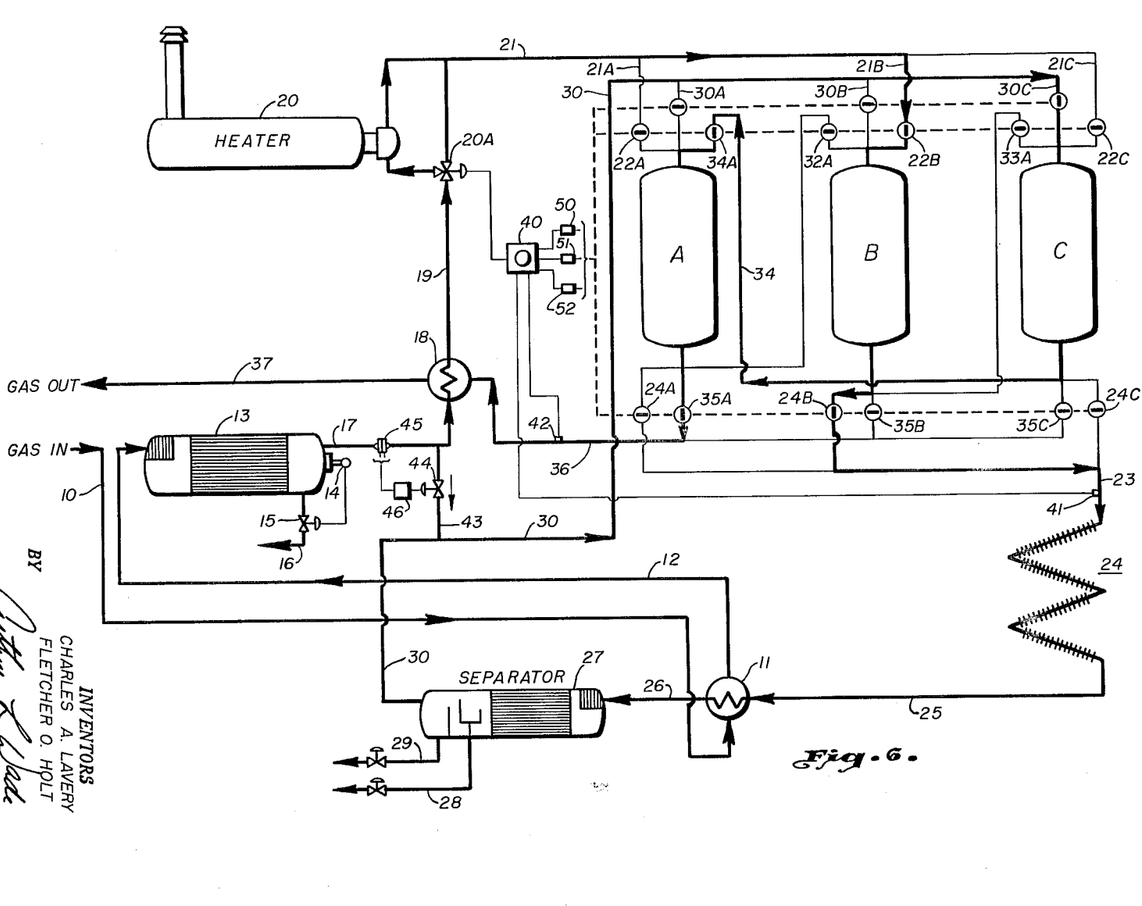
FIG. 6 is a diagrammatic flow of the complete hydrocarbon recovery system of FIG. 1 in third of its three positions.

FIGS. 1, 4 and 6 must be considered together to follow the three basic connections of the adsorbent beds to the main flow stream. As the main flow stream is cycled through these connections in the sequence indicated, each bed is in turn heated, cooled and placed on adsorption service. Cycling the beds through this sequence is basically controlled by a temperature which represents the predetermined minimum temperature to which each bed is heated to vaporize water and hydrocarbons adsorbed by the bed from the main stream. Under certain conditions it will be desirable to additionally control the cycle sequence by the temperature of the bed cooled after having been heated. These two indices of control can be applied to the cycling of the bed-stream connection in parallel.

Considering FIGS. 1, 4 and 6 together, the main stream of natural gas is indicated as being brought into the system with conduit 10. Conduit 10 leads to heat exchanger 11 and conduit 12 takes the main stream to knock-out separator 13. Free liquids are removed from the stream in separator 13. Level control 14 on valve 15 indicates control over discharge of these liquids through conduit 16.

Conduit 17 removes the gas stream from separator 13 to a heat exchanger 18. From heat exchanger 18, conduit 19 takes the stream to heater 20. Three-way valve 20A is controlled to either direct the stream of conduit 19 through heater 20 or around heater 20 and directly to conduit 21.

Conduit 21 is a manifold from which branch conduits 21A, 21B and 21C connect 21 to the three beds of adsorbent as determined by the setting of two-way valves 22A, 22B and 22C. A heavy-line of drawing has been used to indicate in FIG. 1 that manifold conduit 21 is connected to tower C. Valve 22C is indicated as open to make this connection. Valves 22A and 22B are indicated as closed.

To remove the gas stream of conduit 21 from the bottom of towers A, B, and C in which the adsorbent beds are carried, conduit 23 is connected as a manifold to the bottoms of the towers through valves 24A, 24B and 24C. Again, a heavy-line of drawing is used to indicate tower C is connected to conduit 23 in FIG. 1. Valve 24C is indicated as open and valves 24A and 24B are indicated as closed.

Conduit 23 then takes the gas stream through an aerial cooler 24. Conduit 25 takes the cooled stream to heat exchanger 11. Conduit 26 takes the cooled stream to separator 27.

Separator 27 removes hydrocarbons through conduit 28 and water through conduit 29. A valve is indicated in each conduit for the control of the respective liquids from separator 27. Level controls associated with the separator and the valves are not indicated, being an unnecessary detail in this disclosure.

Conduit 30 removes the gas stream from separator 27 for passing down through the beds in towers A, B and C. At the top of the bed towers, conduit 30 becomes a manifold from which branch conduits 30A, 30B and 30C connect to the bed towers A, B and C through valves 31A, 31B and 31C. Again, the heavy-line of the drawing in FIG. 1 indicates conduit 30 connected to tower A. Valves 31B and 31C are correspondingly closed.

When the gas stream from conduit 30 passes out any one of the towers, it is passed through one of the remaining two towers. In FIG. 1, the gas is indicated as passed from tower A into tower B. More specifically, conduit 32 is valved with valve 32A to pass the gas through tower B. FIG. 4 indicates that the gas of conduit 30 passed through tower B is passed, conduit 33 through valve 33A and into tower C. FIG. 6 indicates that the gas of conduit 30, passed through tower C is passed, by conduit 34, through valve 34A. In all these connections of conduit 30 to the bed towers, the gas stream of conduit 30 is passed from the towers through one of valves 35A, 35B or 35C and into conduit 36. Conduit 36 then takes the gas stream, completely processed, to heat exchanger 18. Conduit 37 takes the processed gas out of the process and to a transmitting pipe line or other point of use.

*Process function*

The main flow stream of natural gas is processed through the three beds of adsorbent in series. First, the stream is heated by heater 20. The heated stream brought to about 600 deg. F. and passed into tower C of FIG. 1.

Tower C has already adsorbed water and hydrocarbons from the main stream. The heated stream raises the bed temperature, the gas into manifold conduit 23 increasing from about 100 deg. F. to about 400 deg. F. 400 deg. F. at the discharge of a tower, insures the entire bed has been brought to a temperature which will vaporize water and those hydrocarbons which the process is intended to recover.

The 400 deg. F. gas in conduit 23 is then cooled. First atmospheric cooler 24 lowers the temperature. Other means of cooling may be used. Heat exchanger 11 illustrates how any cooling capacity of the incoming stream in conduit 10 may be used. As the stream cools, water and hydrocarbons begin to condense. In general, by the time the stream has reached separator 27, the water and hydrocarbons desired of recovery have condensed, the stream is within 10 to 15 degrees of ambient, and such liquids are drawn from the separator 27 through conduits 28 and 29.

The high temperature of the gas stream from heater 20 has enabled the stream to carry both its original liquefiable components and those of tower C. The larger proportion of these are then removed by the cooling of exchangers represented by 24 and 11. However, water and hydrocarbons saturating the gas of conduit 30 are next adsorbed in tower A. The stream from tower A is stripped, at the pressure and temperature of the tower A, by the adsorbent therein.

Tower B has just finished being brought up to temperature by the stream in conduit 21. The temperature in its top is around 500 deg. F. This temperature has a gradient down to about 400 deg. F. in the tower bottom. The stripped, denuded, stream of tower A is then passed through this hot tower B to cool it in preparation for the tower to go back on service to adsorb liquefiable components from the gas of conduit 30.

The temperature of the outgoing gas in conduit 36, is then salvaged by heat exchanger 18. The heat is passed into the stream going to heater 20 and thus recycled in the system. The outgoing gas is then passed from the system, leaving its liquefiable components in conduits 28 and 29.

General cycle of bed-gas stream connection

Figure 2:
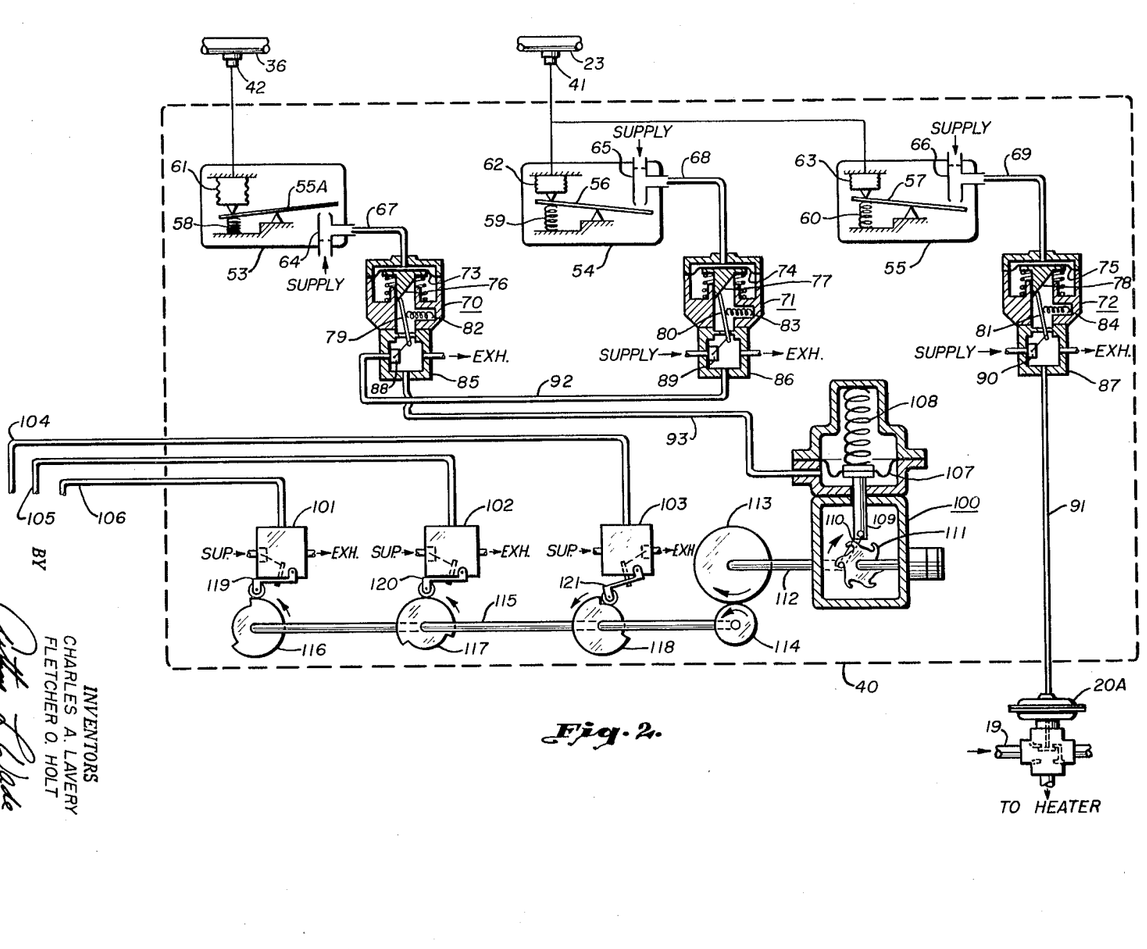
FIGS. 2 and 2A together comprise a diagrammatic representation of the control system which cycles the beds of FIG. 1 through their connection to the main gas stream.

FIGS. 1, 4 and 6 depict the three different connections made between the gas stream and the beds to carry out the basic process. In FIG. 1, tower A is on adsorption, in FIG. 4, tower B and in FIG. 6, tower C. In FIG. 2, tower C is being heated, in FIG. 4, tower A and in FIG. 6, tower B. In FIG. 1, tower B is being cooled, in FIG. 4, tower C and in FIG. 6, tower A.

The valves of the towers are all switched at the same time. The time is basically set by the temperature of the manifold-conduit 23. When this temperature reaches about 400 deg. F. regeneration is complete and cooling of the bed can begin with the gas stripped by the tower on adsorption. However, it may be desirable to permit the switch to occur only when both the heated tower has been brought up to the predetermined temperature and the cooled tower has been brought down to a satisfactory temperature for adsorption service. The present invention is also embodied in the control system which provides for these two temperature conditions to regulate the switching.

Also, it may be desirable to heat the stream of conduit 19 for only a portion of the time the tower being heated is being brought up to a temperature. Valve 20A becomes the means for terminating the heating of the stream in conduit 19. This valve 20A is actuated to by-pass the stream around heater 20 and conduct it directly from conduit 19 into conduit 21.

Control station 40 generates this control action under the direction of temperature element 41 in conduit 23 and temperature element 42 in conduit 36. These control elements feed their signals into station 40 and generate the control impulses necessary to switch the towers and by-pass the heater 20 to carry out the process.

Volume control of regenerating gas

The various units of these systems must be carefully sized to make the cost of the complete system economical. The heater 20 is an important unit in this respect. The total volume of gas in conduit 19 must be carefully considered when selecting a heater sized to bring the temperature of the stream up high enough to heat the tower to be regenerated to the neighborhood of 400 deg. F.

At times the volume of the total stream may exceed the design capacity of heater 20. The present invention provides for by-passing a portion of the stream in conduit 17 around both heater 20 and the heated tower. Conduit 43 is connected between conduit 17 and conduit 30 and controlled by valve 44.

The flow of the stream in conduit 17 is detected as a pressure differential across orifice 45 and transmitted to controller 46. The impulse generated in controller 46 then opens valve 44 when the flow in conduit 17 reaches a predetermined value. The by-passed gas of conduit 17 is then passed into the adsorbing tower along with the output of separator 27 and no recoverable products are lost downstream of the system.

Control station 40 and the tower valves

Figure 2A:
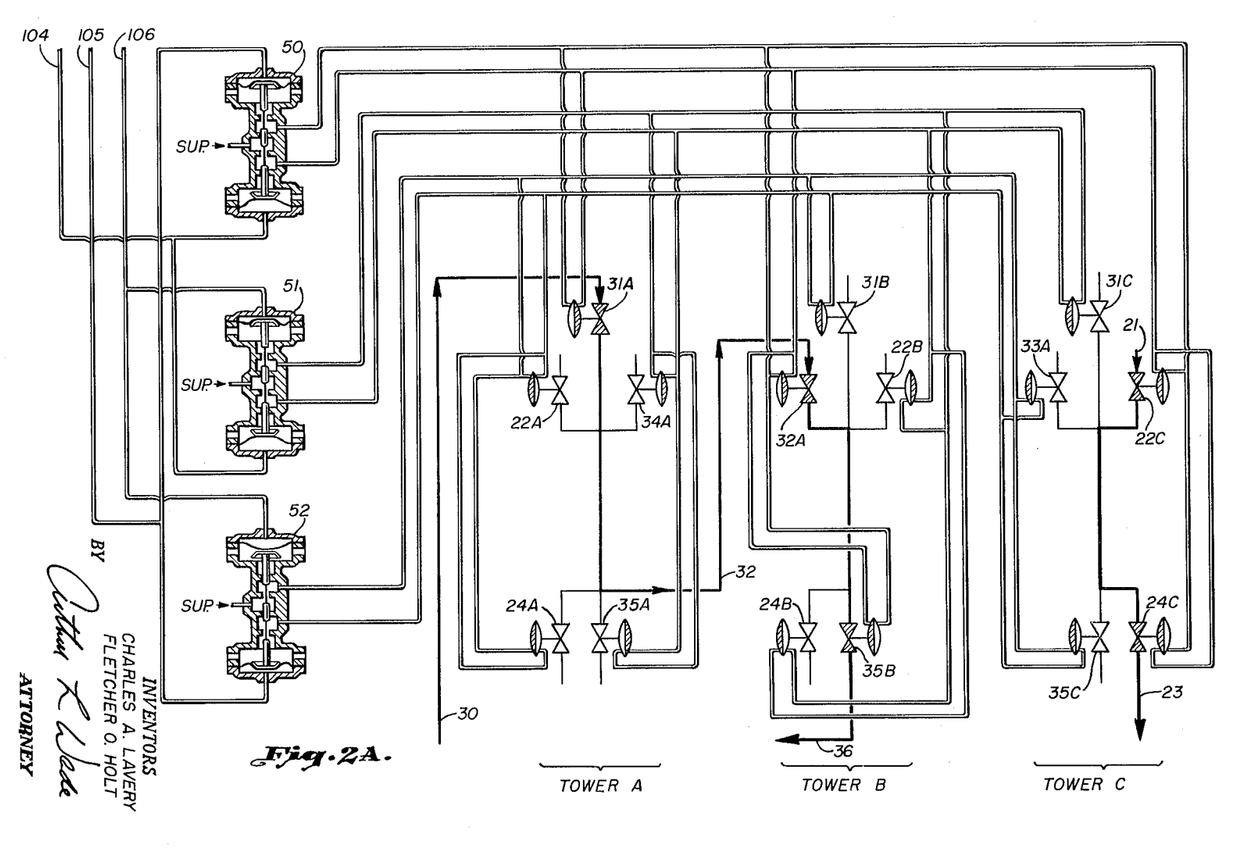
Figure 5:
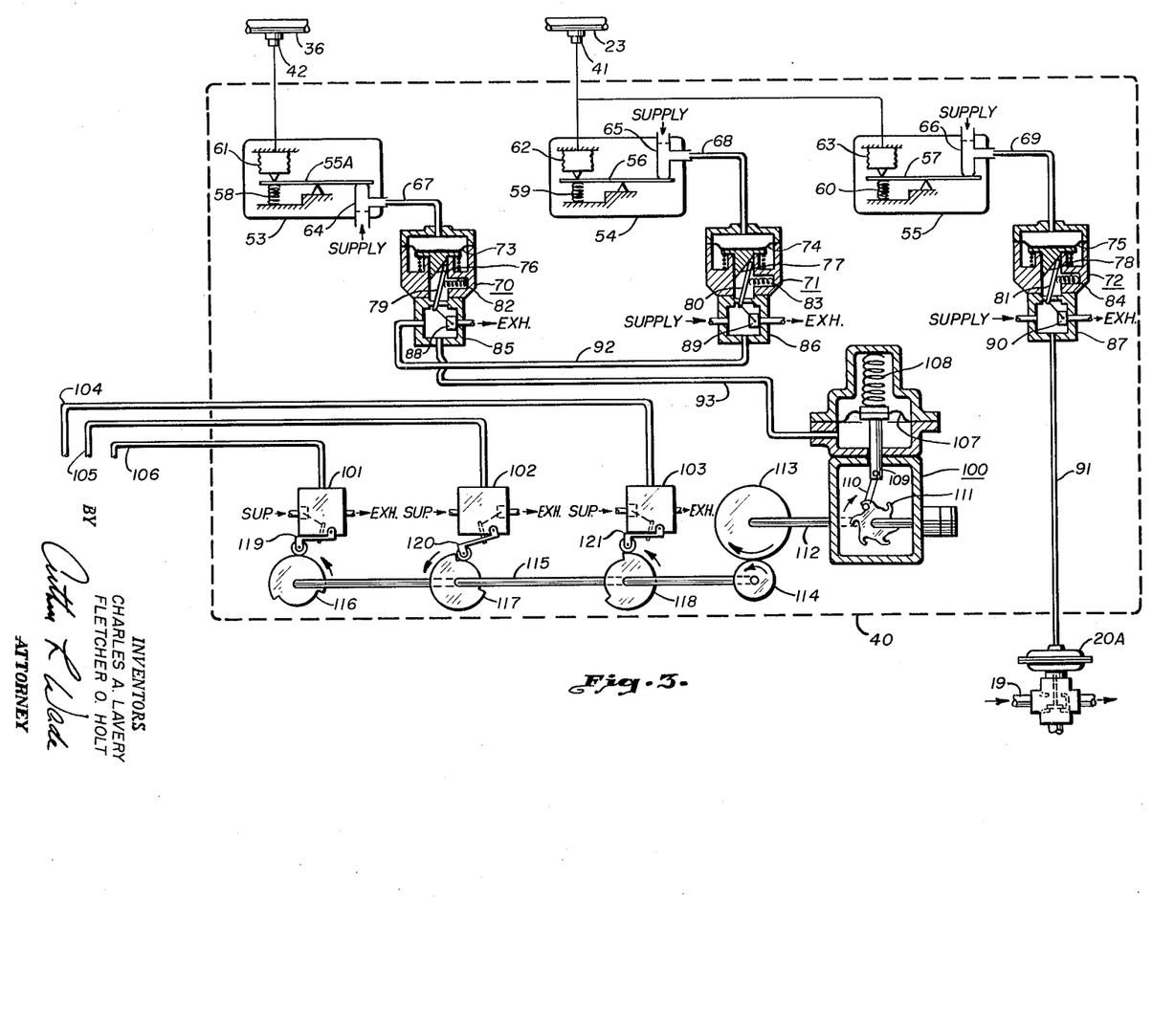
FIGS. 5 and 5A are diagrammatic representations of the control system positioned to connect the towers of FIG. 4 in the positions illustrated in FIG. 4.

FIGS. 2 and 2A are to be considered together as a single, complete illustration of the control system responsive to the temperature elements 41 and 42 in control of the tower valves connecting the main stream to the towers A, B and C, as depicted in FIG. 1. Temperature responsive elements 41 and 42 are shown, feeding their signals into relays within control station 40. The relay structure within control station 40 is depicted diagrammatically, generating control impulses for relay valves 50, 51 and 52 in FIG. 2A and valve 20A in FIG. 2. The entire control is illustrated in FIGS. 2 and 2A. These figures duplicate FIG. 1 in showing the position of all parts as the towers are connected to the main stream in FIG. 1. Tower C is being brought up to regeneration temperature and tower B is being cooled to working temperature. FIG. 3 then illustrates the shift in position of the structure of control station 40 as the temperature values predetermined for tower C and tower B are reached. FIGS. 4, 5 and 6 then come under consideration as the next position to which the control system moves.

The control system disclosed operates from the power of a gas supply. This supply can be the gas of the main stream. It could be an air supply from a separate compressor. Each relay unit and valve supplied this source of power, is indicated as receiving such gas individually. Actually, many of the units are supplied from a common manifold. However, the present connection is used to simplify the illustration for a more clear understanding of the basic function of the system.

The temperature responsive elements 41 and 42 are part of a so-called "filled" system. The principle involved is embodied in a completely closed system incorporating a bulb, an expansible member and connecting capilliary, all filled with a liquid. The volume of this fluid is established by the temperature to which the bulb is exposed. Increase of this volume expands the expansible member to give a movement which actuates a relay supplied the gas pressure of the source.

The tower valves, on the other end of the system, are diaphragm-operated, two position valves. The connection used in illustration is that the control pressure beneath the diaphragm opens the valve. The control pressure on top of the diaphragm closes the valve.

Set-point relays 53, 54 and 55

Control station 40 contains three relay mechanisms which respond directly to temperature elements 41 and 42. The relays 53, 54 and 55 are depicted as simple, position-balance types of relays. Fulcrumed levers 55A, 56 and 57 have calibrated springs 58, 59 and 60 acting on one end while opposed by the force of bellows 61, 62 and 63. Bellows 61, 62 and 63 are the expansible members responding to the temperatures to which elements 41 and 42 are subject.

The opposite end of levers 55A, 56 and 57 act as flappers to control the back pressure in systems having gas-supplied nozzles 64, 65 and 66. As the flapper-levers are brought down on nozzles 64, 65 and 66 their outputs are increased to the limit of their gas supplied. Springs 58, 59 and 60 determine the value of temperature which will bring nozzle and flapper together to give the output increase. The nozzle outputs are established in pipes 67, 68 and 69 and takne to snap-acting relays 70, 71 and 72.

Note is made of the fact that each of relays 53, 54 and 55 has a predetermined, adjustable relation to temperature responsive elements 41 and 42. The manual adjustment of springs 58, 59 and 60 enables each relay to set the point in the range of temperature to which it responds and establish outputs in pipes 67, 68 and 69. Relay 55 can terminate the heating of tower C at one temperature value while relay 54 can establish its output in pipe 68 at a second temperature. This means the system has the flexibility of adjusting when to stop heating of tower C so it will slight up to its maximum temperature of 400 deg. F. The switch of the towers will then be permitted when the predetermined temperature in the neighborhood of 400 deg. F. is reached.

Relay 53 can be used to control the tower switching in series with relay 54. Tower B is cooled to a level at which its absorbent bed will carry out adsorption efficiently. Temperature element 42, through relay 53, permits the tower switch to occur when both temperature conditions have been met. Again, adjustment of the value of low temperature level at which switch will be made can be set by adjustment of spring 58.

Snap-action relays 70, 71 and 72

Relays 70, 71 and 72 respond to the control impulses generated in pipes 67, 68 and 69. The control impulse is placed in the diaphragm operators of the snap-action relays to position three-way valves controlling power impulses applied to a sequency relay and heater by-pass valve 20A.

More specifically, each of relays 70, 71 and 72 has casings in which diaphragms 73, 74 and 75 are mounted to receive the control impulses on their upper sides and move cam surfaces 76, 77 and 78 downward.

Cam surfaces 76, 77 and 78 move in a vertical direction to rotate levers 79, 80 and 81 about their fulcrums against the force of springs 82, 83 and 84. Levers 79, 80 and 81, positioned by their cam surfaces and springs, are the actuated element of three-way, two-position valves 85, 86 and 87.

Valves 85, 86 and 87 may take the form of the structure disclosed and claimed in Swatsworth 2,860,660. The commercial form of this valve is diagrammatically illustrated at 85, 86 and 87 and these valves function quite simply to alternately position their valve elements 88, 89 and 90 over their two side ports. The side ports and lower central port are connected to a supply pressure source, exhaust or control pipes as required to obtain the function of the system.

Snap-action relay 72 is simply connected to supply through one side port and exhaust through the other side port. Valve element 90 then positions to either connect the supply to pipe 91 or the exhaust to pipe 91. The supply pressure then positions heater by-pass valve 20A to by-pass the main stream around heater 20 or conduct the main stream through heater 20. Therefore, at a predetermined value of temperature in conduit 23, valve 20A will terminate the heating of the main stream as it flows into a tower whose bed is to be regenerated.

This predetermined temperature should be in the neighborhood of 500 deg. F. to insure the entire bed being raised to at least 400 deg. F. Relay 55 can be set to actuate snap-action relay 72 when temperature element 41 senses a value at about 200 deg. F. which temperature at 41 indicates the 500 deg. F. temperature at the top of the bed has been reached. Specifically, relay 55 sends its signal to snap-action relay 72 to position valve element 90 so it will connect supply pressure to pipe 91.

Snap-action relay 71 is then actuated by relay 54 when temperature element 41 reaches the neighborhood of 400 deg. F. This temperature indicates the bed is completely regenerated. Specifically, snap-action relay 71 is actuated to move its valve element 89 to connect pipe 92 to supply.

Pipe 92 connects to one side part of snap-action relay 70. When snap-action relay 70 is actuated by relay 53, pipe 92 is connected to pipe 93 so the supply pressure may be applied to the diaphragm of indexing relay 100. As generally explained before, relay 53 responds to temperature element 42. When the temperature at 42 is in the neighborhood of 150 deg. F., the bed being cooled after having been regenerated is ready to return to adsorption service.

*Indexing relay 100*

Indexing relay 100, actuated by the control impulse placed in pipe 93 by snap-action relays 70 and 71, has direct control over the sequence in which the tower valves are actuated. In general, the indexing relay includes three-way, two-position valves similar to valves 85, 86 and 87. These valves 101, 102 and 103 are actuated, in the indexing relay, to place either a supply pressure in pipes output 104, 105 and 106 or connect the pipes to exhaust. Here again, the practical system of manifolding the supplies to these valves, as well as the supplies to valves 85, 86 and 87 has not been shown to avoid needless complication of the drawing.

Mechanical linkage is arranged between valves 101, 102 and 103 and the control pressure of pipe 93. In this mechanical linkage is included a diaphragm 107 loaded in one direction by spring 108. A piston 109 is attached to the center of diaphragm 107 and reciprocated by the supply pressure of pipe 93 being periodically applied to move the diaphragm against the spring force.

A ratchet is formed by a loop-link 110 and toothed wheel 111. Each tooth on wheel 111 represents a position for the tower valves. These teeth represent a complete cycle of valve actuation to connect the towers A, B and C to the main stream. Six teeth are formed on wheel 111 by loop-link 110 rotates shaft 112. Gear, or the system of tower valves through two complete cycles.

The shape of the teeth of wheel 111, and the length of loop-link 110, provide for the teeth to hook the loop-link 110. Each downward stroke of piston 109 causes loop-link 110 to ride down over the back of a tooth and engage the hook portion of the tooth. The upward stroke of piston 109 then rotates wheel 111 one tooth.

Wheel 111 is mounted on shaft 112. Rotation of wheel 111 by loop-link 110 rotates shaft 112. Gear, or friction wheel, 113 is mounted on shaft 112. Gear, or friction wheel 114 is rotated by tooth, or friction, engagement with 113. Wheel 114 is mounted on shaft 115 so rotation of wheel 114 rotates shaft 115.

Cams 116, 117 and 118 are mounted on shaft 115. Cams 116, 117 and 118 are shaped to actuate roller arms 119, 120 and 121, at predetermined points in their rotation. Once actuated to a new position, the roller arms 119, 120 and 121 are maintained in their new positions for a predetermined degree of rotation by a constant radius portion of the cam surface. The cam surface of the three cams are shaped and indexed, relative to each other to place their respective supply pressures in pipes 104, 105 and 106, as control pressures at predetermined points in the rotation of shaft 115 and maintain these pressures for predetermined degrees of rotation of the shaft.

*Cycle of station 40 operation in FIGS. 2 and 3*

Reference to both FIG. 2 and FIG. 3 will aid understanding of the complete cycle of operation of control station 40 in placing control pressures in pipes 104, 105 and 106 under the demand of temperature conditions of conduits 23 and 36.

FIG. 2 illustrates the positions of the units in control station 40 as tower C is being heated and as tower B is being cooled. Bellows 62 and 63 are expanding and bellows 61 is contracting. Without pressures in pipes 67, 68 and 69 snap-action relays 70, 71 and 72 have their pistons 76, 77 and 78 in their up positions. Pipes 91, 92 and 93 are connected to exhaust. Index relay 100 has its piston 109 in the down position and valve 20A is positioned to direct the main stream through heater 20. In this particular position of cams 116, 117 and 118 only output pipe 104 is pressured from supply.

FIG. 3 illustrates the positions of the units in control station 40 as tower C reaches its predetermined temperature of about 400 deg. F. and tower B reaches its predetermined temperature of about 150 deg. F. Pipes 92 and 93 are connected together and both are connected to supply pressure.

Set-point relay 55 is shown as having reached its set-point value of temperature pressuring pipe 91 and setting valve 20A so it will by-pass heater 20 with the main stream. Set-point relay 55 may have reached its set-point value well ahead of set-point relays 53 and 54 reaching their respective set-points. In all events, FIG. 3 shows the condition of control station 40 as a cycle is completed. Indexing relay 100 is pulsed by the pressure of pipes 92 and 93. Cams 116, 117 and 118 are rotated so valves 101, 102 and 103 are actuated to exhaust output pipe 104, pressure pipe 105 and maintain pipe 106 exhausted.

The FIG. 3 position of control station 40 connects tower A to the heated main stream to be regenerated.

Tower C which had been regenerated in FIG. 1 is now cooled by the stripped stream from tower B. Tower B receives the gas stream from separator 27. The temperature in conduit 23 takes a sharp drop as the heat of the main stream begins to unload into the bed of tower A. The temperature in conduit 36 takes a sharp rise as the heat begins to unload from the bed of tower C. The set-point relays 53, 54 and 55 return to the position shown in FIGS. 2 and 5, but the position of the cams remains in the position shown in FIG. 5. FIG. 3, therefore, represents a transition between the position of FIG. 2 and the position of FIG. 5.

*Tower valve operation (FIG. 2A)*

FIG. 2A is actually an extension of FIG. 2 in showing pipes 104, 105 and 106 distributing their pressures to relay valves 50, 51 and 52. Relay valves 50, 51 and 52 are supplied from a gas source to distribute its pressure directly to the diaphragms of the tower valves.

Relay valves 50, 51 and 52 each distribute their supply pressure alternately to two manifold pipes connected by branch pipes to the diaphragms of the tower valves. Relay valves 50, 51 and 52 are shifted by the pressures of pipes 104, 105 and 106 applied to either of their two ends. If the shifting pressure is removed from the end of one of the relay valves, the valve will remain in that position until shifted in the opposite direction by a pressure. Simple in operation, the two manifolds from each of relay valves 50, 51 and 52 are connected by branch pipes to the tower valves in making the required connection of the main stream to the three towers A, B and C.

FIG. 2A shows relay valves 50, 51 and 52 positioned to open valves 31A, 32A and 35B to direct the main stream gas of manifold conduit 30 through tower A and tower B in series. Also, valves 22C and 24C are open to direct the heated main stream through tower C. The flow pattern, and the tower valves controlling it can be traced in FIG. 1 and FIG. 2A. Shaded areas have been used to illustrate the side of each tower valve diaphragm pressured from the relay valves 50, 51 and 52. Each diaphragm pressured on the side toward the valve element is open. Each diaphragm pressured on the side away from the valve element is closed.

It would appear that the control pressures from output pipes 104, 105 and 106 could be applied directly to the manifold pipes on the outputs of relay valves 50, 51 and 52. However, there are practical difficulties with such close coupling between the control station 40 outputs and the tower valves. The cam calling for closure of certain tower valves would have to be mechanically indexed with precision with the cam calling for opening of other tower valves. Also, the volume of piping to be pressured and depressured through control station 40 valves 101, 102 and 103 is relatively large. These large volumes would introduce another variable which would militate against precise operation of the tower valves.

Assigning both closing and opening functions of tower valves to relay valves 50, 51 and 52 eliminates the problem of precise mechanical timing between cams. Any one of pipes 104, 105 and 106 is branched to shift two of relay valves 50, 51 and 52 simultaneously. Each of relay valves 50, 51 and 52 simultaneously pressures certain tower valves and depressures certain tower valves. The possibility of overlap in the operation of the tower valves is therefore greatly reduced. Valves 101, 102 and 103 can operate from a supply source pressure compatible with the piping volume between control station 40 and shift valves 50, 51 and 52. Relay valves 50, 51 and 52 can operate from a pressure compatible with the larger volume of piping between relay valves 50, 51 and 52 and the tower valves.

Figure 5A:
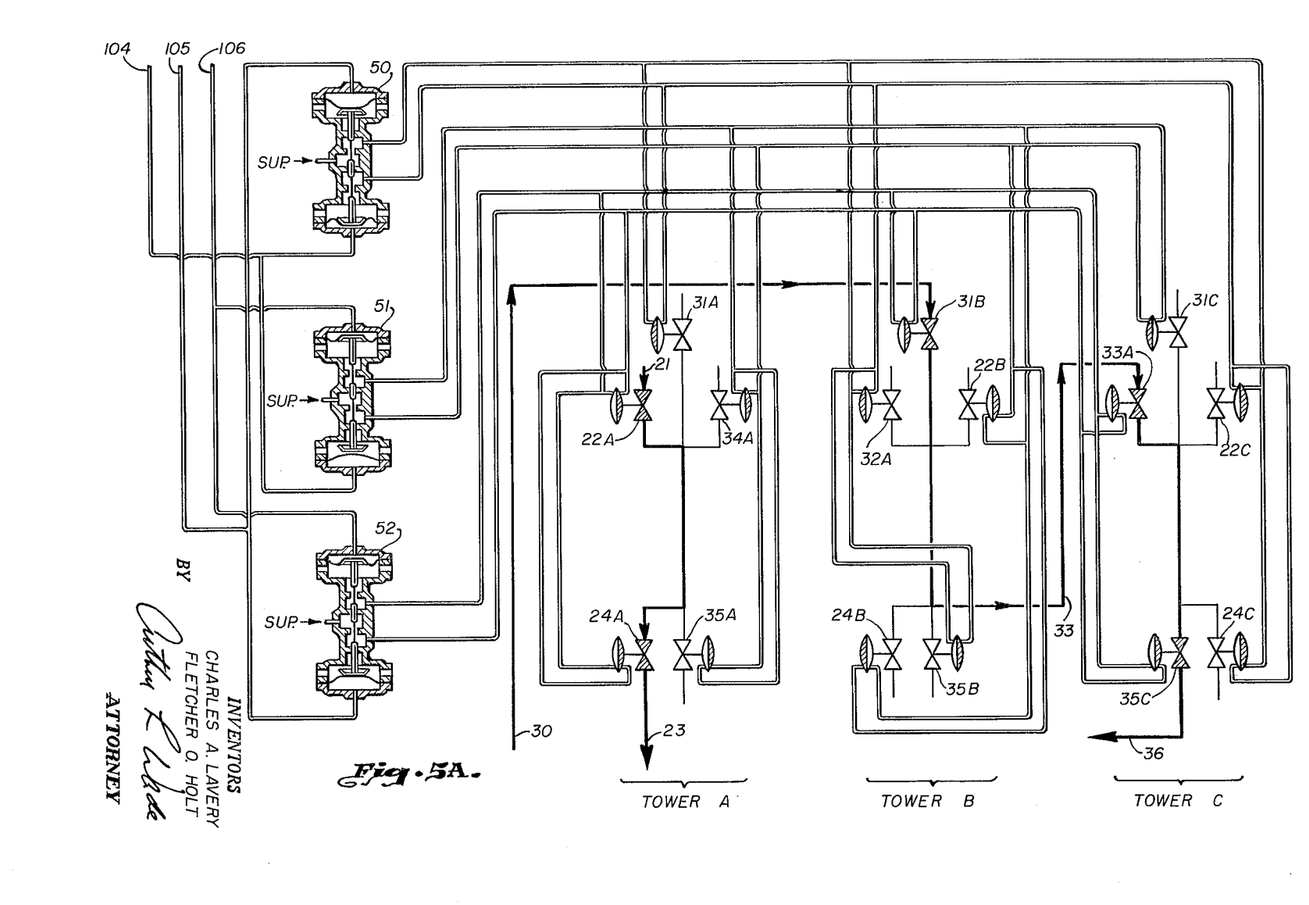

*FIGS. 4, 5 and 5A*

The transition from FIG. 1 to FIG. 4 has been previously explained. FIG. 3 provided disclosure of how the transition was brought about as the temperatures sensed by elements 51 and 42 reached the set-points of relays 53, 54 and 55 of control station 40. Indexing relay 100 was pulsed by the pressure in pipe 93 and cams 116, 117 and 118 repositioned to FIG. 3–FIG. 5 position.

Tower A is regenerated, tower B processes the main stream and tower C is cooled by the tail-gas from tower B. The third position of the control system is assumed as the temperature to which element 41 responds reaches 400 deg. F. and the temperature to which element 42 responds reaches 150 deg. F. No transition illustration is deemed necessary, FIG. 3 having served that purpose previously.

Figure 7:
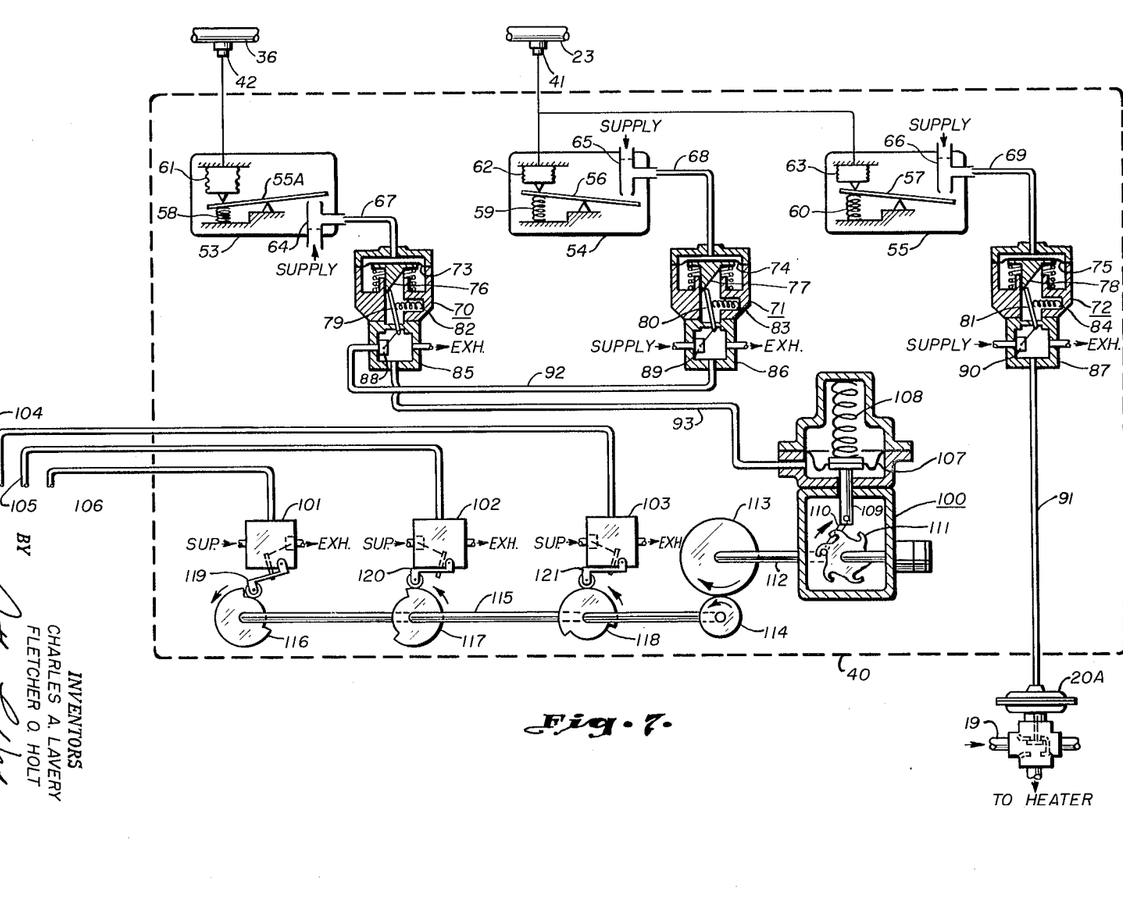
FIGS. 7 and 7A diagrammatically represent the control system positioned to place the valves of FIG. 6 in the position illustrated in FIG. 6.
Figure 7A:
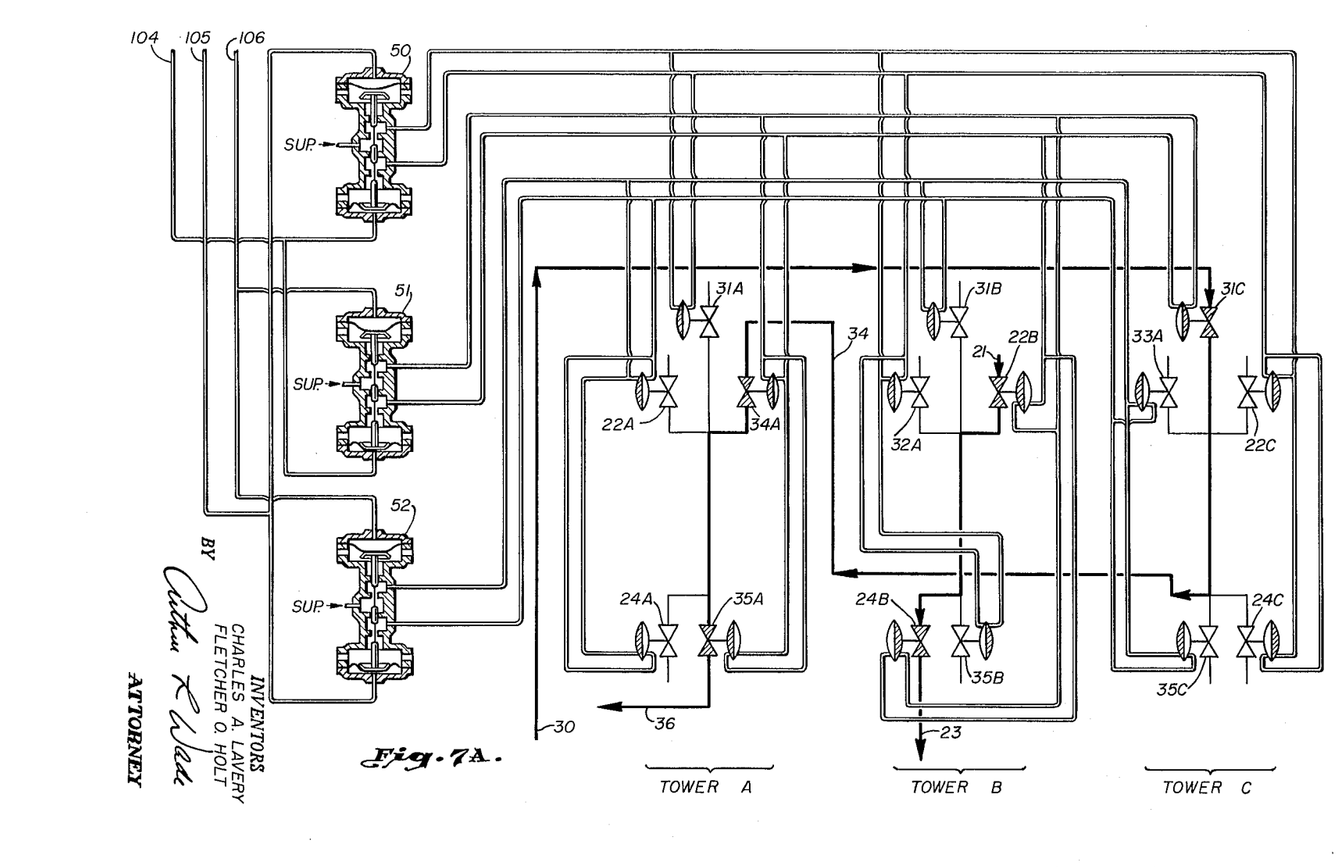

*FIGS. 6, 7 and 7A*

In the third position of the tower valves, tower B is regenerated, tower C processes the main stream and tower A is cooled by the tail-gas from tower C. From this position, the control station 40 returns its cams, relay valves 50, 51 and 52 and tower valves to their FIG. 2 position from which there is a repeat of the three-step cycle of operation.

*Temperature control of cycle*

The temperature sensed by element 41 dominates the function of control station 40 as the towers are connected sequentially to the main flow stream. As each regenerated tower is brought up to temperature (400 deg. F.) the system is prepared to shift to its next position. The temperature at element 42 (150 deg. F.) may have to be satisfied as well. However, this temperature at 42 could be eliminated as a control element in some instances. The temperature at 41, however, signals that basic regeneration has been completed, and this index basically paces the cycle speed.

As the throughput regeneration gas of the heated tower varies, the cycle time varies. The variation tends to maintain a constant ratio between the weight of adsorbent material and the volume of material recovered from the processed stream. With the system designed to a specific ratio of adsorbent weight and condensible volume, the temperature index functions to maintain the system efficiency of operation from this standpoint as the volume and temperature of the main stream received varies.

*By-pass flow control*

It is anticipated that the total volume of incoming gas to be processed will, at times, exceed the over-all design of the system. Above a certain value the volume of gas through heater 20 may exceed the capacity of the heater to bring the temperature of the main stream up high enough to reach the regeneration temperature necessary for the heated tower. Therefore, conduit 43 is brought into operation.

Flow rate in conduit 17 is detected. Orifice 45 represents a primary element which can generate control over valve 44 in conduit 43 to pass a portion of the main flow stream around both heater 20, the heater tower and the separator 27. The main gas stream portions split in this manner are rejoined so the combined stream will be processed by a tower. No loss of recoverable water and hydrocarbons takes place downstream of the system and regeneration is thus assured throughout a predetermined range of total main stream volume input to the system.

*Heat exchanger 18*

Transfer of heat from conduit 36 to conduit 19 may be desirable, depending on various temperature conditions within the system. Certainly downstream temperature may be important. Excessive temperature in the stream discharged from the system can cause mechanical-thermal difficulties in downstream metering and transmission apparatus. Also, any heat which can be cycled in the system is very important from an economic standpoint. Therefore, exchanger 18 may be very valuable in scavenging heat from conduit 36 and/or controlling downstream temperature from the unit.

Heat Exchanger 11

Various means for reducing the temperature of gas in conduits 23 and 25 may be utilized. If the incoming main stream gas has the cooling capacity, exchanger 11 may be very valuable in driving the regeneration stream down to its condensing level. Here again, the specific temperature relationships in the system govern the advisability of using exchanger 11 as illustrated.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A process for the removal of water and hydrocarbons from a natural gas stream with fixed beds of adsorbent including,
   heating an entire main flow stream so the entire stream may act as a reactivating gas for a bed of adsorbent material,
   passing the entire heated stream through a first bed of said fixed beds of adsorbent material which has adsorbed water and hydrocarbons from a cool portion of the entire main flow stream until a predetermined temperature of the entire main stream has been reached,
   reducing the temperature of the entire main stream from the first bed of adsorbent material until water and hydrocarbons are condensed,
   removing the condensed liquids from the process,
   passing the cooled gaseous portion of the entire main stream through a second bed of adsorbent material to adsorb water and hydrocarbons from the gaseous portion of the stream,
   passing the entire processed stream from the second bed through a third bed of adsorbent material which has been heated to the regeneration temperature to cool the third bed to a predetermined temperature,
   and switching the heated stream to the second bed and the cooled gaseous portion to the third bed and the cooling stream to the first bed as the two predetermined temperatures are reached, the switching being repeated as the temperatures are reached.

2. An adsorption system having fixed beds of adsorbent for removing water and hydrocarbons from a natural gas stream including,
   a first bed of said fixed beds of adsorbent material which has adsorbed water and hydrocarbons from a main stream of natural gas,
   a heater connected to pass the entire main stream of gas through the heater to heat the stream as a reactivating agent for the first bed,
   means for establishing the flow of the entire heated main stream through the first bed until the bed is raised to a predetermined temperature,
   a heat exchanger connected to the first bed to pass the entire stream from the first bed to reduce the temperature of the stream until water and hydrocarbons are condensed therefrom,
   a separator connected to the heat exchanger to receive the gaseous portion of the entire stream and condensate and from which water and hydrocarbons are removed from the system,
   a second bed of adsorbent material which has had water and hydrocarbons desorbed therefrom connected to the separator to receive the gaseous portion of the stream from the separator to remove water and hydrocarbons therefrom,
   a third bed of adsorbent material which has been heated by the entire main stream from the heater connected to receive the gaseous portion of the stream from the second bed,
   means for maintaining the flow of the gaseous portion of the stream through the third bed until the bed has its temperature reduced to a predetermined value,
   and a control system for connecting each of the three beds to the stream until each bed in turn has adsorbed water and hydrocarbons from the main stream, had its temperature raised by the main stream and had its temperature reduced by the gaseous portion of the main stream.

3. A process for the removal of water and hydrocarbons from a natural gas stream with fixed beds of adsorbent including,
   heating an entire main flow stream so the entire stream may act as a reactivating gas for a bed of adsorbent material,
   passing the entire heated stream through a first bed of said fixed beds of adsorbent material which has previously adsorbed water and hydrocarbons from a cool portion of the entire main flow stream to raise the temperature of the adsorbent material and vaporize the adsorbed water and hydrocarbons,
   reducing the temperature of the entire main stream from the first bed of adsorbent material until water and hydrocarbons are condensed,
   removing the condensed liquids from the process,
   passing the cooled gaseous portion of the entire main stream through a second bed of adsorbent material to adsorb water and hydrocarbons from the gaseous portion of the stream,
   passing the entire processed stream from the second bed through a third bed of adsorbent material which has previously been heated by the main flow stream to lower the temperature of the adsorbent material,
   and passing the heated stream through the second bed and the cooled stream through the third bed and the stream from the third bed through the first bed when the first bed is heated to a predetermined temperature and the third bed is cooled to a predetermined temperature, the streams and beds being changed each time the temperatures are reached.

4. An adsorption system having fixed beds of adsorbent for removing water and hydrocarbons from a natural gas stream including,
   a first bed of said fixed beds of adsorbent material which has adsorbed water and hydrocarbons from a main stream of natural gas,
   a heater connected to pass the entire main stream of gas through the heater to heat the stream as a reactivating agent for the first bed,
   means for conducting the entire heated main stream through the first bed and thereby raising the temperature of the bed and vaporizing the water and hydrocarbons it has adsorbed,
   a heat exchanger connected to the first bed to pass the entire stream from the first bed to reduce the temperature of the stream until water and hydrocarbons are condensed therefrom,
   a separator connected to the heat exchanger to receive the gaseous portion of the entire stream and condensate and from which water and hydrocarbons are removed from the system,
   a second bed of adsorbent material which has had water and hydrocarbons desorbed therefrom connected to the separator to receive the gaseous portion of the stream from the separator to remove water and hydrocarbons therefrom, a third bed of adsorbent material which has been heated by the entire main stream from the heater connected to receive the gaseous portion of the stream from the second bed, means for conducting the gaseous portion of the stream from the second bed through the third bed to reduce its temperature without appreciable adsorption of water and hydrocarbons, and means for switching the heated main stream to the second bed and the stream from the separator to the third bed and the stream from the third bed through the first bed when the first bed is heated to a predetermined temperature and the third bed has had its temperature lowered to a predetermined value, the streams and beds being changed each time the temperatures are reached.

5. An adsorption system having fixed beds of adsorbent for removing water and hydrocarbons from a natural gas stream including, a first bed of said fixed beds of adsorbent material which has adsorbed water and hydrocarbons from a main stream of natural gas, a heater connected to pass the entire main stream of gas through the heater to heat the stream as a reactivating agent for the first bed, means for conducting the entire heated main stream through the first bed and thereby raising the temperature of the bed and vaporizing the water and hydrocarbons it has adsorbed, a heat exchanger connected to the first bed to pass the entire stream from the first bed to reduce the temperature of the stream until water and hydrocarbons are condensed therefrom, a separator connected to the heat exchanger to receive the gaseous portion of the entire stream and condensate and from which water and hydrocarbons are removed from the system, a second bed of adsorbent material which has had water and hydrocarbons desorbed therefrom connected to the separator to receive the gaseous portion of the stream from the separator to remove water and hydrocarbons therefrom, means for conducting the entire main stream from the first bed through the heat exchanger and the separator and the second bed, a third bed of adsorbent material which has been heated by the entire main stream from the heater connected to receive the gaseous portion of the stream from the second bed, means for conducting the gaseous portion of the stream from the second bed through the third bed and to a point of use to reduce its temperature without appreciable adsorption of water and hydrocarbons, a valve system through which passes the flow to and from the beds, a first temperature element mounted in the means for conducting the entire main stream from the first bed, a second temperature element mounted in the means for conducting the entire main stream from the third bed to the point of use, and control means responsive to the temperature elements for generating control signals to the valve system which will connect the heated main stream to the second bed and the separator stream to the third bed and the stream from the third bed to the first bed when the temperature elements sense predetermined temperatures, the reconnecting being carried out each time the temperatures are reached.

6. An adsorption system having fixed beds of adsorbent for removing water and hydrocarbons from a natural gas stream including, a conduit system conducting an entire natural gas stream through three beds of said fixed beds of adsorbent material in series, a heater connected to the conduit system through which the main stream is passed to heat the entire stream as a reactivating agent for the adsorbent material, a heat exchanger connected to the conduit system through which the entire stream heated by the heater and passed through a bed is passed to reduce the temperature of the stream until water and hydrocarbons are condensed therefrom, a separator connected to the conduit system and receiving the gaseous portion of the stream and condensate and from which water and hydrocarbons are removed from the system, a valve system in the conduit system and controlling the conduction of the entire stream in turn through the heater and a first of the beds and the heat exchanger and the separator and a second of the beds and a third of the beds, a temperature element mounted in the conduit system for the stream as the conduit comes from the first bed, and control means responsive to the temperature element to generate control signals as the entire stream from the heater and each bed which is heated by the entire stream reaches a predetermined temperature which will shift each of the beds in series
   (a) from being heated by the entire stream,
   (b) to being cooled by the gaseous portion of the stream as the gaseous portion of the stream flows from the separator and a bed,
   (c) to processing the gaseous portion of the stream flowing from the separator.

7. A process for the removal of water and hydrocarbons from a natural gas stream with fixed beds of adsorbent including, heating an entire main flow stream so that entire stream may act as a reactivating gas for a bed of said fixed beds of adsorbent material, passing the entire heated stream through a first bed of adsorbent material which has previously adsorbed water and hydrocarbons from a cool portion of the entire main flow stream to raise the temperature of the adsorbent material and vaporize the adsorbed water and hydrocarbons, reducing the temperature of the entire main stream from the first bed of adsorbent material until water and hydrocarbons are condensed, removing the condensed liquids from the process, passing the cooled gaseous portion of the entire main stream through a second bed of adsorbent material to adsorb water and hydrocarbons from the gaseous portion of the stream, passing the entire processed stream from the second bed through a third bed of adsorbent material which has previously been heated by the main flow stream to lower the temperature of the adsorbent material, and passing the heated stream through the second bed and the cooled stream through the third bed and the stream from the third bed through the first bed each time in the complete cycle on a temperature variation program of the beds which will maintain substantially constant the ratio between the weight of adsorbent exposed to the gaseous portion of the entire main flow stream to adsorb water and hydrocarbons therefrom and the volume of their condensables recovered from the gas stream.

8. An adsorption system having fixed beds of adsorbent for removing water and hydrocarbons from a natural gas stream including, a first bed of said fixed beds of adsorbent material which has adsorbed water and hydrocarbons from a main stream of natural gas, a heater connected to pass the entire main stream of gas through the heater to heat the stream as a reactivating agent for the first bed, means for conducting the entire heated main stream through the first bed and thereby raising the temperature of the bed and vaporizing the water and hydrocarbons it has adsorbed, a heat exchanger connected to the first bed to pass the entire stream from the first bed to reduce the temperature of the stream until water and hydrocarbons are condensed therefrom, a separator connected to the heat exchanger to receive the gaseous portion of the entire stream and condensate and from which water and hydrocarbons are removed from the system, a second bed of adsorbent material which has had water and hydrocarbons desorbed therefrom connected to the separator to receive the gaseous portion of the stream from the separator to remove water and hydrocarbons therefrom, means for conducting the entire main stream from the first bed through the heat exchanger and the separator and the second bed, a third bed of adsorbent material which has been heated by the entire main stream from the heater connected to receive the gaseous portion of the stream from the second bed, means for conducting the gaseous portion of the stream from the second bed through the third bed and to a point of use to reduce its temperature without appreciable adsorption of water and hydrocarbons, a valve system connecting the beds and through which passes the flows to and from the beds, and control means responsive to temperature variations of the beds generating control signals to the valve system which will shift the connection of the heated main stream to the second bed and the separator stream to the third bed and the stream from the third bed to the first bed and each time in the complete cycle to maintain a constant ratio of the weight of adsorbent exposed to the gaseous portion of the entire main flow stream to adsorb water and hydrocarbons to the volume of water and hydrocarbons recovered from the gas stream.

References Cited by the Examiner
UNITED STATES PATENTS

| | | | |
|---|---|---|---|
| 2,665,769 | 1/1954 | Walker et al. | 55—62 X |
| 2,739,669 | 3/1956 | Miller | 55—62 X |
| 2,919,764 | 1/1960 | Dillman et al. | 55—62 X |

REUBEN FRIEDMAN, *Primary Examiner.*